(12) United States Patent
Tsuji et al.

(10) Patent No.: US 8,495,968 B2
(45) Date of Patent: Jul. 30, 2013

(54) HONEYCOMB FILTER PRODUCTION APPARATUS

(75) Inventors: Hiroyuki Tsuji, Nagoya (JP); Takayoshi Akao, Nagoya (JP); Shuhei Fujita, Nagoya (JP); Kazuhi Matsumoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 28 days.

(21) Appl. No.: 13/049,205

(22) Filed: Mar. 16, 2011

(65) Prior Publication Data

US 2011/0229635 A1    Sep. 22, 2011

(30) Foreign Application Priority Data

Mar. 18, 2010 (JP) ................................ 2010-062248
Mar. 1, 2011 (JP) ................................ 2011-043877

(51) Int. Cl.
*B05B 13/06* (2006.01)
*B05C 19/00* (2006.01)
*B05C 11/00* (2006.01)

(52) U.S. Cl.
USPC ............ 118/306; 118/308; 118/317; 118/712

(58) Field of Classification Search
USPC .......... 118/308, 309, 306, 317, 712, DIG. 10, 118/70, 602, 61–64; 427/180, 345, 230, 236
See application file for complete search history.

(56) References Cited

U.S. PATENT DOCUMENTS

| | | | |
|---|---|---|---|
| 3,830,902 A * | 8/1974 | Barnes | 264/267 |
| 4,420,508 A | 12/1983 | Gibson | |
| 4,698,241 A | 10/1987 | Roberson | |
| 5,454,872 A * | 10/1995 | Lader et al. | 118/602 |
| 5,722,802 A | 3/1998 | March | |
| 2005/0001869 A1 * | 1/2005 | Abernathy et al. | 347/17 |
| 2007/0227447 A1 | 10/2007 | Kukkurainen et al. | |
| 2008/0171135 A1 * | 7/2008 | Burch | 427/58 |

FOREIGN PATENT DOCUMENTS

| | | |
|---|---|---|
| DE | 42 25 970 C1 | 4/1994 |
| EP | 0 943 372 A2 | 9/1999 |
| EP | 1 775 021 A1 | 4/2007 |
| JP | 10-249124 A1 | 9/1998 |
| JP | 10-263340 A1 | 10/1998 |
| JP | 2006-000685 A1 | 1/2006 |

OTHER PUBLICATIONS

U.S. Appl. No. 13/049,146, filed Mar. 16, 2011, Hiroyuki Tsuji.

* cited by examiner

*Primary Examiner* — Yewebdar Tadesse
(74) *Attorney, Agent, or Firm* — Burr & Brown

(57) ABSTRACT

A honeycomb filter production apparatus includes: a workpiece securing section for securing a base of a honeycomb filter; a powder transfer section for transferring a powder together with an air current by utilizing pressurized gas; an introduction section for introducing the powder that has transferred from the powder transfer section into the base secured by the workpiece securing section when the apparatus is used; a suction section for sucking the gas that has passed through the base secured by the workpiece securing section using suction means; a cleaning section for removing a surplus powder adhering to an end face of the base after the introduction of the powder; a judgment section for judging an amount of the powder adhering to the base; and a workpiece transfer section for transferring the base among the workpiece securing section, the cleaning section, and the judgment section.

17 Claims, 7 Drawing Sheets

HONEYCOMB FILTER PRODUCTION APPARATUS

BACKGROUND OF THE INVENTION

The present invention relates to an apparatus that produces a honeycomb filter that includes a base formed of a porous body, and a collection layer that is formed on the surface of the base and collects particles.

Exhaust gas discharged from an internal combustion engine (e.g., diesel engine) or a combustion apparatus contains a large amount of particulate matter (PM) that mainly contains soot (graphite). If PM is directly discharged to the atmosphere, environmental pollution occurs. Therefore, a filter apparatus including a diesel particulate filter (DPF) that collects PM is normally provided in an exhaust gas passage.

For example, a honeycomb filter having a honeycomb structure has been known as the DPF (element) included in such a filter apparatus. The honeycomb filter includes a plurality of cells (gas passages) defined by a partition wall formed of a porous ceramic having a number of pores (i.e., has a honeycomb structure), one open end and the other open end of adjacent cells being alternately plugged. When exhaust gas is introduced into one open end of the cells of the canned honeycomb filter, the exhaust gas passes through the partition wall, and is discharged from the other open end of the adjacent cells. PM is collected and removed by the partition wall when the exhaust gas passes through the honeycomb filter, so that the exhaust gas is purified.

However, such a honeycomb filter tends to show a rapid increase in pressure loss due to coat of PM. JP-A-10-249124, JP-A-2006-685, and JP-A-10-263340 disclose honeycomb filters having a novel structure aimed at reducing a pressure loss. These honeycomb filters are characterized in that a honeycomb structure (i.e., porous body) is used as a base (support), and a collection layer that collects PM is formed on the surface of the base. JP-A-10-249124, JP-A-2006-685, and JP-A-10-263340 also disclose a method of producing such a honeycomb filter.

SUMMARY OF THE INVENTION

The invention was conceived in view of the above situation. An object of the invention is to provide a means that enables a high-quality honeycomb filter having a configuration in which a collection layer having a uniform thickness is formed on the surface of a base formed of a porous body, to be produced with high productivity and high yield. As a result of extensive studies, it was found that the above object can be achieved by the following means. This finding has led to the completion of the invention.

According to one aspect of the invention, there is provided a honeycomb filter production apparatus used for producing a honeycomb filter, the apparatus including:

a workpiece securing section for securing a base of a honeycomb filter;

a powder transfer section that is disposed on one side of the workpiece securing section, and transfers a powder together with a pressurized gas (e.g., air);

an introduction section that is provided between the powder transfer section and the workpiece securing section, the powder transferred from the powder transfer section together with the pressurized gas being mixed with another gas (e.g., air) in the introduction section, and introduced into the base secured by the workpiece securing section when the apparatus is used;

a suction section that is disposed on the other side of the workpiece securing section, and sucks the gas that has passed through the base secured by the workpiece securing section by reducing pressure on the other side of the workpiece securing section as compared with the one side of the workpiece securing section using suction means;

a cleaning section for removing a surplus powder adhering to an end face of the base after the introduction of the powder;

a judgment section for judging an amount of power adhering to the base; and a workpiece transfer section driven by a driving mechanism and transferring the base among the workpiece securing section, the cleaning section, and the judgment section.

A honeycomb filter produced by the above honeycomb filter production apparatus includes a base having a pillar-like (preferably columnar or quadrangular prism) external shape formed by an outer circumferential surface and two end faces, the base including a plurality of cells (fluid passages) that extend from one end face to the other end face, and are defined by a partition wall formed of a porous ceramic, one open end and the other open end of adjacent cells being alternately plugged, and a collection layer being formed on the inner surface of the base.

The term "workpiece" used herein refers to the base (porous body) of the honeycomb filter. The workpiece (i.e., the base of the honeycomb filter) is secured by the workpiece securing section when using the honeycomb filter production apparatus. The inner surface of the base (workpiece) of the honeycomb filter on which the collection layer is formed refers to the surface of the base that defines the cells, and may be referred to as the inner surface of the cells. The area of the base that defines the cells is referred to as "partition wall" or "cell wall". The inner surface of the base, the inner surface of the cells, the surface of the partition wall and the cell wall have an identical meaning. The one side of the workpiece securing section on which the powder transfer section is disposed may be referred to as "inlet side", and the other side of the workpiece securing section on which the suction section is disposed may be referred to as "outlet side".

In the introduction section, the powder transferred from the powder transfer section together with a pressurized gas (e.g., air) is mixed with another gas (e.g., air), and introduced into the base secured by the workpiece securing section. The introduction section is an open space. Specifically, the honeycomb filter production apparatus according to one aspect of the invention includes the workpiece securing section, and the powder transfer section disposed on one side of the workpiece securing section, and has an open space (i.e., introduction section) between the powder transfer section and the workpiece securing section. The dimensions of the introduction section (i.e., the distance between the workpiece securing section and the powder transfer section (the distance between the base secured by the workpiece securing section and the powder transfer section)) are preferably equal to or larger than the diameter of a minimum circle that includes the end face of the base on the side of the powder transfer section, and more preferably equal to or larger than a value three times the diameter of the minimum circle. Incidentally, the "minimum circle that includes the end face of the base on the side of the powder transfer section" means a circle corresponding to the shape and the size of the end face (circle having the same diameter as that of the end face) in the case that the shape of the end face of the base on the side of the powder transfer section is circular, and, in the case of the shape of the end face of the base on the side of the powder transfer section is not circular, for example, polygonal, it means a circumcircle 80 of the end face 11a of the substrate on the side of the powder transfer section. The honeycomb filter production apparatus according to one aspect of the invention may include one introduction section, and two or more powder transfer sections.

The gas that includes the powder dispersed therein, and the pressurized gas used to disperse the powder are normally air. The pressure of the pressurized gas is not particularly limited, but is preferably about 1.5 to 5 atmospheres.

The honeycomb filter production apparatus according to one aspect of the invention produces a honeycomb filter in which a collection layer is formed on the inner surface of the base. The honeycomb filter production apparatus according to one aspect of the invention is a dry coat apparatus that can faun the collection layer on the target object (base) using the powder dispersed in gas (hereinafter may be referred to as "aerosol"). In the honeycomb filter production apparatus according to one aspect of the invention, the powder is ejected from the powder transfer section together with pressurized gas, and mixed with another gas air) in the introduction section. The resulting mixed gas is introduced into the cells of the base, and sucked from the other side of the base. In this case, the gas passes through the partition wall of the base, but the powder does not pass through the partition wall of the base, and is coated on the inner surface of the cells (i.e., the inner surface of the base). The base and the powder are bonded (integrated) by the subsequent heat treatment to form a collection layer.

The cleaning section is a section for removing a surplus powder adhering to an end face of the substrate after the introduction of the powder. Though almost all the powder introduced into the base is coated on the inner surfaces of the cells, at least a part of the powder adheres to the end face of the base on the side of the powder transfer section. The powder coated on the inner surfaces of the cells forms a collection layer after firing. On the other hand, the powder adhering to the end face of the base has to be removed after the introduction of the powder since it is a surplus powder, which does not form a collection layer. The surplus powder adhering to the end face of the base after the introduction of the powder is removed by the cleaning section to be able to efficiently produce a honeycomb filter having excellent quality with no surplus powder remaining thereon.

The judgment section is a section for judging the amount of the powder adhering to the base. In order to stably produce honeycomb filters having a uniform quality, it is necessary that the adhesion amount is within a predetermined range with no variance in the adhesion amount (coat amount) of the powder among the bases. Since the judgment section judges the adhesion amount, whether the amount is within the predetermined range or not can easily be known, and therefore honeycomb filters having excellent quality can stably be produced.

The workpiece transfer section is a section for transferring the base among the workpiece securing section, the cleaning section, and the judgment section. The workpiece transfer section is driven by a driving mechanism. For example, it reciprocates with a predetermined stroke in a front-back direction as a general walking beam. By transferring the base among the workpiece securing section, the cleaning section, and the judgment section by the workpiece transfer section, the efficiency of the coat operation improves to obtain high productivity.

In a honeycomb filter production apparatus of the present invention, it is preferable that the cleaning section is provided with an air nozzle or a brush as a powder removing means for removing the surplus powder.

In a honeycomb filter production apparatus of the present invention, it is preferable that the judgment section is provided with a scale for measuring the weight of the base before the introduction of the powder and a scale for measuring the weight of the base after the introduction of the powder as judgment means for judging the amount of the powder adhering to the base.

In a honeycomb filter production apparatus of the present invention, it is preferable that the driving mechanism for driving the workpiece transfer section is disposed above the work piece securing section. In addition, it is preferable that the workpiece transfer section is provided with opening and closing clamps each having a resin contact face with the base and being capable of controlling the clamp load as a holding means for holding the base upon transferring the base.

In the honeycomb filter production apparatus according to one aspect of the invention, the powder transfer section preferably includes powder-dispersing means that utilizes pressurized gas. Examples of the powder-dispersing means include an ejector and an aerosol-producing chamber. It is preferable that the powder-dispersing means be an ejector. It is preferable that the ejector sucks the powder by utilizing a pressurized gas, and discharges the powder together with the pressurized gas so that the powder is dispersed in the gas. In this case, the ejector disperses the powder in the gas, and ejects the powder together with the pressurized gas. Specifically, the ejector sucks the powder by utilizing a negative pressure produced by a high-speed gas (e.g., pressurized gas), and discharges the powder together with the pressurized gas. The powder transfer section may include only one ejector, or may include two or more ejectors. It is preferable that the powder suction direction and the powder discharge direction of the ejector be approximately parallel.

In the honeycomb filter production apparatus according to one aspect of the invention, the powder transfer section preferably includes powder-feeding means that supplies a given amount of powder. When the honeycomb filter production apparatus includes the ejector, a plurality of powder-feeding means may be provided on the powder suction side of the ejector.

In the honeycomb filter production apparatus according to one aspect of the invention, the introduction section preferably includes a guide member that guides the powder to the base secured by the workpiece securing section. When the base has a pillar-like shape, the guide member may have a shape corresponding to the external shape of the base (workpiece) (particularly the shape of the end face of the base). The guide member preferably has a tubular shape having a cross section similar to the external shape of the base (particularly the shape of the end face of the base). The guide member may have a columnar (cylindrical) shape or a square pipe shape. When the base has a columnar shape, the guide member preferably has a columnar (cylindrical) shape having a diameter almost equal to or larger than the diameter of a minimum circle that includes the end face of the base. The guide member preferably has a length equal to or larger than the diameter of a minimum circle that includes the end face of the base on the side of the powder transfer section, and more preferably equal to or larger than a value three times the diameter of the minimum circle. The end of the guide member opposite to the workpiece securing section is open. The end of the guide member on the side of the workpiece securing section is preferably positioned close to the end face or the outer circumferential surface of the base secured by the workpiece securing section. It is more preferable that the end of the guide member on the side of the workpiece securing section be in contact with the end face or the outer circumferential surface of the base, and sealed.

In the honeycomb filter production apparatus according to one aspect of the invention, it is preferable that the base of the honeycomb filter have a pillar-like shape, an axial direction of the base secured by the workpiece securing section be approximately vertical during use, with the pressurized gas flow upward. Specifically, the honeycomb filter production apparatus according to one aspect of the invention is preferably used so that the base is disposed vertically, and at air the pressurized gas passes through the base upward. The axial direction of the base is approximately vertical when the axial direction of the base is within 30° with respect to the gravity direction. It is more preferable that the axial direction of the base be within 15° with respect to the gravity direction. Specifically, it is preferable that the honeycomb filter production apparatus according to one aspect of the invention be configured so that the base can be disposed vertically.

In the honeycomb filter production apparatus according to one aspect of the invention, the powder transfer section or the introduction section preferably includes (powder) classification means. Centrifugal classification, gravity classification, or the like is preferably used as the classification means. In this case, the diameter of the powder transfer section or the introduction section may be increased, or a curved area may be formed in the powder transfer section or the introduction section, or an area where a pressurized gas flow downward may be formed in the powder transfer section or the introduction section.

In the honeycomb filter production apparatus according to one aspect of the invention, the workpiece securing section preferably includes a cover that covers the side surface of the base. The cover may have a shape similar to the external shape of the base. In the honeycomb filter production apparatus according to one aspect of the invention, the suction section preferably includes a flowmeter. Since the suction target is the gas from which the powder has been removed (due to adhesion to the inner surface of the cells), an anemometer may be used instead of a flowmeter. In the honeycomb filter production apparatus according to one aspect of the invention, the suction section preferably includes a current plate.

In the honeycomb filter production apparatus according to one aspect of the invention, the diameter r of a minimum circle that includes the end face of the base secured by the workpiece securing section on the side of the powder transfer section, and the distance d between the end face of the base on the side of the powder transfer section and the ejection end of the powder transfer section (ejection end of the ejector) preferably satisfy the relationship "$r<d$". In the honeycomb filter production apparatus according to one aspect of the invention, the distance d between the end face of the base secured by the workpiece securing section on the side of the powder transfer section and the ejection end of the powder transfer section, and the length L of the guide member preferably satisfy the relationship "$0.5d<L$".

According to another aspect of the invention, there is provided a method of producing a honeycomb filter including coating the powder on an inner surface of the base of the honeycomb filter using the above honeycomb filter production apparatus while adjusting a flow rate A of a gas a that is sucked by the suction section, a flow rate B of a gas b ejected from the powder transfer section, and a flow rate C of a gas c that is mixed with the gas b in the introduction section so that the relationships "$A=B+C$" and "$C>0$" are satisfied.

For example, the flow rate B of the gas ejected from the powder transfer section may be set to a constant value, and the flow rate A of the gas sucked by the suction section may be set to be higher than the flow rate B by the flow rate C.

The honeycomb filter production apparatus according to one aspect of the invention includes the powder transfer section that is disposed on one side of the workpiece securing section, and transfers the powder together with an a pressurized gas, and the suction section that is disposed on the other side of the workpiece securing section, reduces the pressure on the other side of the workpiece securing section as compared with the one side of the workpiece securing section using the suction means, and sucks the gas that has passed through the base. Therefore, the pressurized gas is aligned in one direction. The powder is uniformly and stably supplied to the cells of the base together with the pressurized gas aligned in one direction. Therefore, the honeycomb filter production apparatus according to one aspect of the invention can reliably coat the powder on the inner surface of the cells to a uniform thickness, so that the collection layer can be reliably formed on the inner surface of the cells to a uniform thickness. Moreover, since the powder rarely scatters as a result of aligning the air pressurized gas in one direction, an excellent work environment is achieved.

In the honeycomb filter production apparatus according to one aspect of the invention, the powder is ejected from the powder transfer section together with pressurized gas, and mixed with another gas (e.g., air) in the introduction section, and the resulting mixed gas (e.g., pressurized gas with mixed air) is introduced into the cells of the base. Since the powder is diffused during mixing, the powder is introduced into the entire end face (cells) of the base. This improves coat distribution uniformity. Moreover, the flow rate of the gas that passes through the base and the flow rate of the pressurized gas that flows through the powder transfer section can be independently controlled. It has been found that the microstructure and the coat distribution of the collection layer change depending on the concentration of the powder contained in the mixed gas introduced in the cells, and the flow rate of the gas. The concentration of the powder contained in the mixed gas introduced in the cells, and the flow rate of the gas may be controlled by adjusting the suction flow rate of the suction section, and the concentration of the powder contained in the mixed gas supplied from the powder transfer section. On the other hand, the powder transfer section requires a given flow rate in order to disperse the powder in the gas. Therefore, it is effective if the flow rate of the mixed gas that passes through the base and the flow rate of the pressurized gas that flows through the powder transfer section can be independently controlled.

In the honeycomb filter production apparatus according to one aspect of the invention, the powder is ejected from the powder transfer section together with an air current, and mixed with another gas in the introduction section, and the resulting mixed gas (air current) is introduced into the cells of the base. Since the powder is diffused during mixing, the powder is introduced into the entire end face (cells) of the base. This improves coat distribution uniformity. Moreover, the flow rate of the air current that passes through the base and the flow rate of the air current that flows through the powder transfer section can be independently controlled. It has been found that the microstructure and the coat distribution of the collection layer change depending on the concentration of the powder contained in the mixed gas introduced in the cells, and the flow rate of the gas. The concentration of the powder contained in the mixed gas introduced in the cells, and the flow rate of the gas may be controlled by adjusting the suction flow rate of the suction section, and the concentration of the powder contained in the mixed gas supplied from the powder transfer section. On the other hand, the powder transfer section requires a given flow rate in order to disperse the powder in the gas. Therefore, it is effective if the flow rate of the air current that passes through the base and the flow rate of the air current that flows through the powder transfer section can be independently controlled.

Since the honeycomb filter production apparatus according to one aspect of the invention utilizes the pressurized gas when dispersing the powder in the gas, a flow rate gradient can be formed by increasing the flow rate. Therefore, a sufficient impact force and shear force can be applied to the powder. As a result, the powder is uniformly dispersed in the gas. A fine powder having a particle size of about 20 μm or less may aggregate and form large particles in a stationary state. In this case, the powder may not be uniformly dispersed in the gas. However, since the honeycomb filter production apparatus according to one aspect of the invention cracks the powder by utilizing the pressurized gas, the above problem does not occur.

In the honeycomb filter production apparatus (dry coat apparatus) according to one aspect of the invention, since the powder is supplied to the inner surface of the cells (i.e., the surface of the partition wall) in a dry state, it is unnecessary to perform a drying step and a cleaning step that are required when using additives such as water and a binder, and an excellent collection layer without defects can be formed on the base (partition wall).

In a honeycomb filter production apparatus of the present invention, the surplus powder adhering to the end face of the base after the introduction of the powder is removed by the cleaning section to be able to efficiently produce a honeycomb filter having excellent quality with no surplus powder remaining thereon.

In a honeycomb filter production apparatus of the present invention, since the judgment section judges the amount (coat amount) of the powder adhering to the base, whether the amount is within the predetermined range or not can easily be known, and therefore honeycomb filters having excellent quality can stably be produced.

In a honeycomb filter production apparatus of the present invention, by transferring the base among the workpiece securing section, the cleaning section, and the judgment section by the workpiece transfer section, the efficiency of the coat operation improves to obtain high productivity.

In a honeycomb filter production apparatus of the present invention, since the cleaning section is provided with an air nozzle as a powder removing means for removing the surplus powder in a preferable mode, by blowing air in parallel with the end face on the side where the powder was introduced by the air nozzle after the introduction of the powder, only the powder adhering to the end face of the base can be removed without peeling the powder disposed on the inner surfaces of the cells of the base.

In a honeycomb filter production apparatus of the present invention, since the cleaning section is provided with a brush in a preferable mode, by brushing the end face, only the powder adhering to the end face of the base can be removed without peeling the powder disposed on the inner surfaces of the cells of the base.

In a honeycomb filter production apparatus of the present invention, since the judgment section is provided with a scale for measuring the weight of the base before the introduction of the powder and a scale for measuring the weight of the base after the introduction of the powder as judgment means for judging the amount of the powder adhering to the base in a preferable mode, by measuring the weight of the base before and after the introduction of the powder by the scales and calculating the difference, a judgment on whether the amount of the powder adhering to the base is within the predetermined range or not can be made with high accuracy in a short period of time.

In a honeycomb filter production apparatus of the present invention, since the driving mechanism for driving the workpiece transfer section is disposed above the work piece securing section in a preferable mode, the powder which did not adhering to the base hardly enters the inside of the driving mechanism, and therefore the wear of the motion portion of the driving mechanism due to the entry of the powder is reduced to improve durability and stabilize the positional accuracy of the transfer.

In a honeycomb filter production apparatus of the present invention, since the workpiece transfer section is provided with opening and closing clamps each having a resin contact face with the base and being capable of controlling the clamp load as holding means for holding the base upon transferring the base in a preferably mode, by controlling the clamp load upon holding the base, the impact upon holding can be controlled to be able to inhibit the powder coated on the inner surfaces of the cells of the base from peeling due to the impact. In addition, since the contact face with the base is made of flexible resin, the base can be inhibited from being damaged upon holding.

The honeycomb filter production apparatus according to one aspect of the invention is preferably configured so that the powder transfer section includes the powder-dispersing means (ejector) that utilizes pressurized gas. In this case, a large amount of powder can be dispersed in the gas, and ejected per unit time. For example, 50 g/min of powder can be dispersed in 0.1 $m^3$/min of gas. Moreover, a given amount of powder can be transferred while cracking large particles, and introduced into the cells. Therefore, the honeycomb filter production apparatus according to one aspect of the invention can reliably and quickly coat the powder on the inner surface of the cells to a uniform thickness, so that the collection layer can be reliably and quickly formed on the inner surface of the cells to a uniform thickness. Since the flow rate of the gas that passes through the base can be easily controlled even when the powder transfer section includes a plurality of ejectors, the collection layer can be reliably formed on the inner surface of the cells to a uniform thickness. Moreover, the powder can be supplied to the ejector by utilizing a pressurized gas suction produced by a negative pressure generated by the ejector. This ensures that the powder does not come in contact with the pipe when the pressurized gas is not supplied to the ejector (i.e., when a negative pressure is not generated (when a pressurized gas is not produced)). This prevents a situation in which the powder is coated on the pipe to produce large particles, or an insufficient powder supply due to a bridge occurs.

The honeycomb filter production apparatus according to one aspect of the invention is preferably configured so that the diameter r of a minimum circle that includes the end face of the base secured by the workpiece securing section on the side of the powder transfer section, and the distance d between the end face of the base on the side of the powder transfer section and the ejection end of the powder transfer section satisfy the relationship "$r<d$". In this case, the powder is uniformly coated on the inner surface of the cells in the diametrical direction of the base. The ejected powder is efficiently and uniformly introduced into all of the cells of the base. Moreover, the size of the apparatus can be reduced. If the end face of the base is positioned close to the ejection end of the powder transfer section (ejection end of the ejector) (i.e., the distance d is short), the powder ejected from the ejector is introduced into only part of the cells of the base. If the end face of the base is positioned away from the ejection end of the powder transfer section (ejection end of the ejector) (i.e., the distance d is long), the powder does not reach the cells of the base, and adheres to another member, or falls downward. This is disadvantageous. The diameter r of a minimum circle that includes the end face of the base secured by the workpiece securing section on the side of the powder transfer section, and the distance d between the end face of the base on the side of the powder transfer section and the ejection end of the powder transfer section (ejection end of the ejector) more preferably satisfy the relationship "$3r<d$".

The honeycomb filter production apparatus according to one aspect of the invention is preferably configured so that the introduction section includes a guide member that guides the aerosol to the base. In this case, diffusion of the aerosol is suppressed, and the pressurized gas is aligned in one direction, so that the yield is improved. Moreover, disturbance (e.g., inflow from the surroundings), the outer circumferential shape of the base, and the like rarely affect the production of the honeycomb filter. The powder is uniformly coated to the inner surface of the cells including the outermost cells in the diametrical direction of the base.

The honeycomb filter production apparatus according to one aspect of the invention is preferably configured so that the end of the guide member opposite to the workpiece securing section is open. In this case, the open end of the guide member functions as an opening for sucking the gas that passes through the base (excluding the aerosol ejected from the ejector). The open end of the guide member functions as an opening for discharging the powder that does not adhere to the base.

The honeycomb filter production apparatus according to one aspect of the invention is preferably configured so that the distance d between the end face of the base secured by the workpiece securing section on the side of the powder transfer section and the ejection end of the powder transfer section, and the length L of the guide member preferably satisfy the relationship "0.5d<L". In this case, the above effects can be sufficiently achieved. Specifically, diffusion of the aerosol is sufficiently suppressed, and the pressurized gas is sufficiently aligned in one direction. Moreover, the size of the apparatus can be reduced. If the end face of the base on the side of the powder transfer section is positioned close to the ejection end of the powder transfer section (ejection end of the ejector) (i.e., the distance d is short), the above effects cannot be sufficiently achieved. If the end face of the base on the side of the powder transfer section is positioned away from the ejection end of the powder transfer section (ejection end of the ejector) (i.e., the distance d is long), the size of the apparatus increases.

The honeycomb filter production apparatus according to one aspect of the invention is preferably configured so that the powder transfer section includes powder-feeding means that supplies a given amount of powder. The concentration of the powder in the aerosol can be easily controlled by sucking a given amount (mass) of powder from the ejector. Therefore, the concentration of the powder in the aerosol can be made constant. When introducing the aerosol having a constant concentration into the cells, the powder can be reliably coated on the inner surface of the cells to a uniform thickness, so that the collection layer can be reliably and quickly formed on the inner surface of the cells to a uniform thickness.

The honeycomb filter production apparatus according to one aspect of the invention is preferably configured so that the workpiece securing section includes a cover that covers the side surface of the base. In this case, the powder is uniformly coated on the inner surface of the cells including the outermost cells in the diametrical direction of the base, even if the base is a honeycomb structure having pores in its side surface (outer circumferential surface). If the base has pores in its side surface, the gas enters the outermost cells through the pores. As a result, the amount of aerosol that enters the cells through the openings of the end face may be reduced, so that the amount of powder that adheres to the inner surface of the cells may decrease. This problem can be solved by providing a cover that covers the side surface of the base. A desired mixed gas flow can be achieved by preventing inflow of gas through the side surface of the base.

The honeycomb filter production apparatus according to one aspect of the invention is preferably configured so that the suction section includes a flowmeter. In this case, the flow rate of the gas that passes through the base can be controlled. As a result, the powder can be reliably coated on the inner surface of the cells to a uniform thickness, so that the collection layer can be reliably and quickly formed on the inner surface of the cells to a uniform thickness.

The honeycomb filter production apparatus according to one aspect of the invention is preferably configured so that the suction section includes a current plate. In this case, the flow rate of the gas that passes through the base can be made more uniform as compared with the case where the suction section does not include a current plate, even if the base has a large number of cells.

The honeycomb filter production apparatus according to one aspect of the invention is preferably configured so that the powder suction direction and the powder discharge direction of the ejector are approximately parallel. In this case, a change in direction of the pressurized gas of the ejector occurs to only a small extent, so that a large amount of powder can be supplied. Moreover, wear of the ejector occurs to only a small extent. It is also possible to suppress occurrence of a bridge (arch) and a rat hole in the pipe and the ejector, and prevent a situation in which powder is not supplied to the ejector.

The honeycomb filter production apparatus according to one aspect of the invention is preferably configured so that the base of the honeycomb filter has a pillar-like shape, an axial direction of the base secured by the workpiece securing section is approximately vertical during use, and the pressurized gas flows upward (i.e., the base is disposed vertically). In this case, the introduction section is provided with a gravity classifier capability with distribution uniformity, so that coat distribution uniformity is improved. If the base is disposed horizontally (i.e., the axial direction of the base secured by the workpiece securing section is approximately horizontal during use), the powder is affected by gravity, and the amount of powder that adheres to the surface of the partition wall that is positioned on the lower side becomes larger than the amount of powder that adheres to the surface of the partition wall that is positioned on the upper side. This particularly occurs when the flow rate of the pressurized gas is low. A situation in which large particles that impair coat enter the cells can be suppressed by vertically disposing the base during use. If large particles have entered the cells, large particles that are not carried by the pressurized gas can then fall downward (i.e., may not adhere to the surface of the partition wall) due to gravity, so that occurrence of a defective product may be prevented. If the base is disposed horizontally, it is necessary to increase the dimensions of the introduction section (i.e., the distance between the workpiece securing section and the powder transfer section) in order to suppress entrance of large particles into the cells. Moreover, coat necessarily becomes insufficient if large particles have entered the cells. Particles that have an appropriate size and do not adhere to the inner surface of the cells return to the introduction section, are mixed with the gas, and are reintroduced into the cells. This improves the yield. When vertically disposing the base, particles that do not adhere to the inner surface of the cells can be easily collected. For example, particles can be easily collected by providing a reception section right under the product. When providing the guide member, the powder can be easily collected by allowing particles that do not adhere to the inner surface of the cells to be discharged through the opening of the guide member. If the base is disposed horizontally, the powder is coated on the guide member, and it takes time to collect the powder. Moreover, the powder may be scattered due to the pressurized gas, and enter the product (i.e., a defective product may be obtained).

Since a control range that ensures sufficient quality can be increased by vertically disposing the base, the apparatus does not become complex, and a high-quality collection layer can be stably formed (coated). A significant effect is achieved when supplying a plurality of types of powder.

When vertically disposing a base having a pillar-like shape, it is preferable that the axial direction of the base be almost identical with the direction of the mixed gas (e.g., the pressurized gas mixed with another gas) formed by the introduction section. The powder may be biased in one direction if the axial direction of the base differs from the direction of the mixed gas formed by the introduction section.

The honeycomb filter production apparatus according to one aspect of the invention is preferably configured so that the powder transfer section or the introduction section includes classification means. In this case, large particles can be excluded, so that occurrence of insufficient coat can be suppressed. The term "large particle" used herein refers to a particle that is not cracked and has a large particle size, a particle that has adhered to a pipe and aggregated, and the like.

The method of producing a honeycomb filter according to one aspect of the invention includes coating the powder on an inner surface of the base of the honeycomb filter using the above honeycomb filter production apparatus while adjusting a flow rate A of a gas a that is sucked by the suction section, a flow rate B of a gas b ejected from the powder transfer section, and a flow rate C of a gas c that is mixed with the gas b in the introduction section so that the relationships "A=B+C" and "C>0" are satisfied. Therefore, the powder mixed with the gas by the ejector can be advantageously dispersed in the gas that passes through the base, so that the powder can be uniformly supplied to the cells of the base. Therefore, the method of producing a honeycomb filter according to one aspect of the invention can reliably coat the powder on the inner surface of the cells to a uniform thickness, so that the collection layer can be reliably formed on the inner surface of the cells to a uniform thickness. The ratio (B/A) of the flow rate B of the gas b to the flow rate A of the gas a is set to be less than 1. The ratio (B/A) is preferably ⅓ or less, and more preferably 1/10 or less. The pressurized gas ejected from the powder transfer section may undergo pulsation when transferring a large amount of powder. If the ratio (B/A) is ⅓ or less, the effect of pulsation on the flow rate distribution of the mixed gas that passes through the workpiece can be reduced. Note that the flow rates A to C refer to flow rates per unit time.

DETAILED DESCRIPTION OF THE EMBODIMENTS

Figure 1:
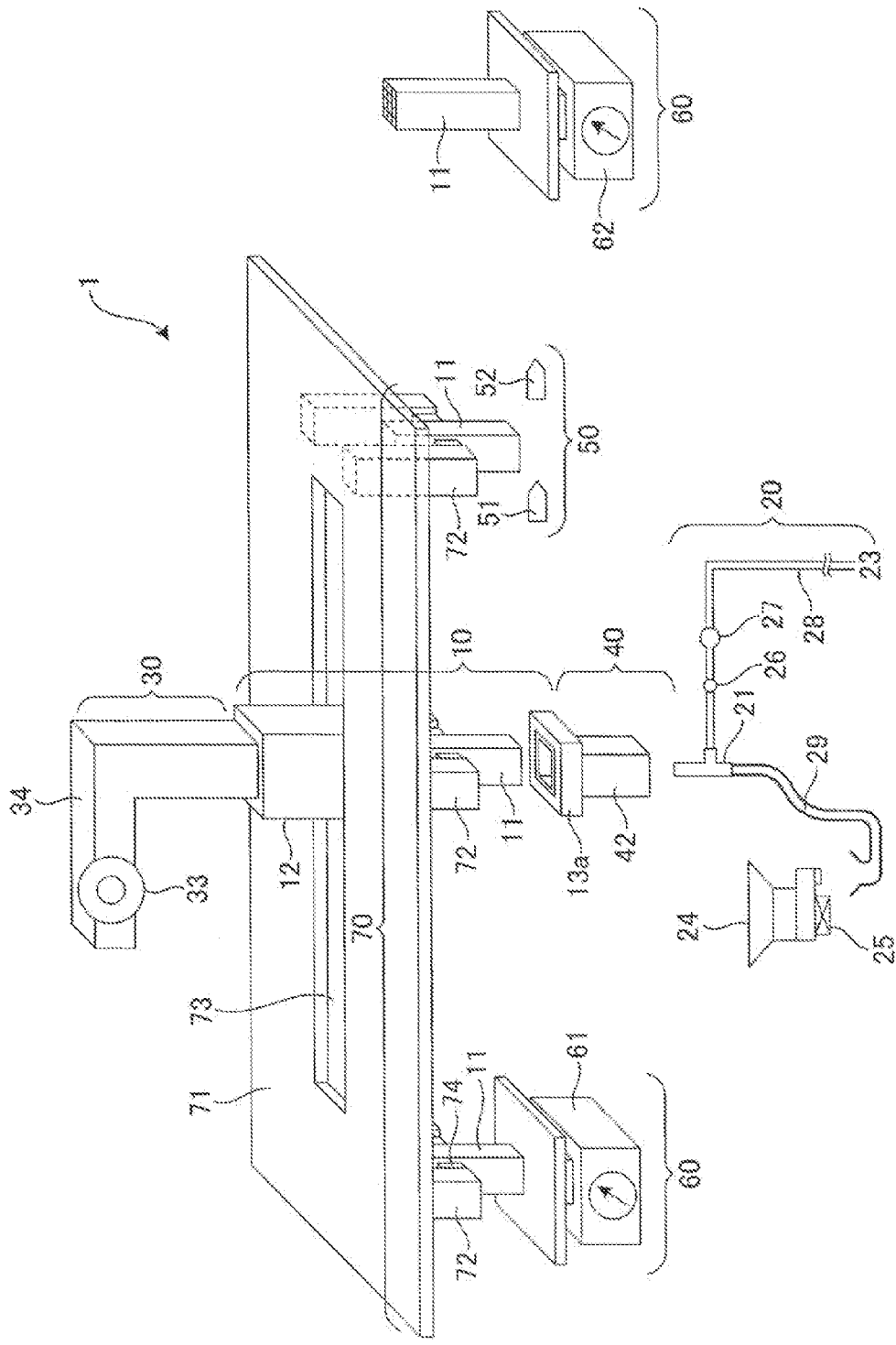
FIG. 1 is a schematic view showing one embodiment of a honeycomb filter production apparatus of the present invention.

Exemplary embodiments of the invention are described below with reference to the drawings. Note that the invention is not limited to the following embodiments. Various alterations, modifications, and improvements may be made of the following embodiments without departing from the scope of the invention based on the knowledge of a person having ordinary skill in the art. For example, although the drawings illustrate preferred embodiments of the invention, the invention is not limited to the embodiments or information illustrated in the drawings. Note that the invention may be practiced or verified by applying means similar or equivalent to means described herein, but preferred means are those described herein.

Figure 7A:
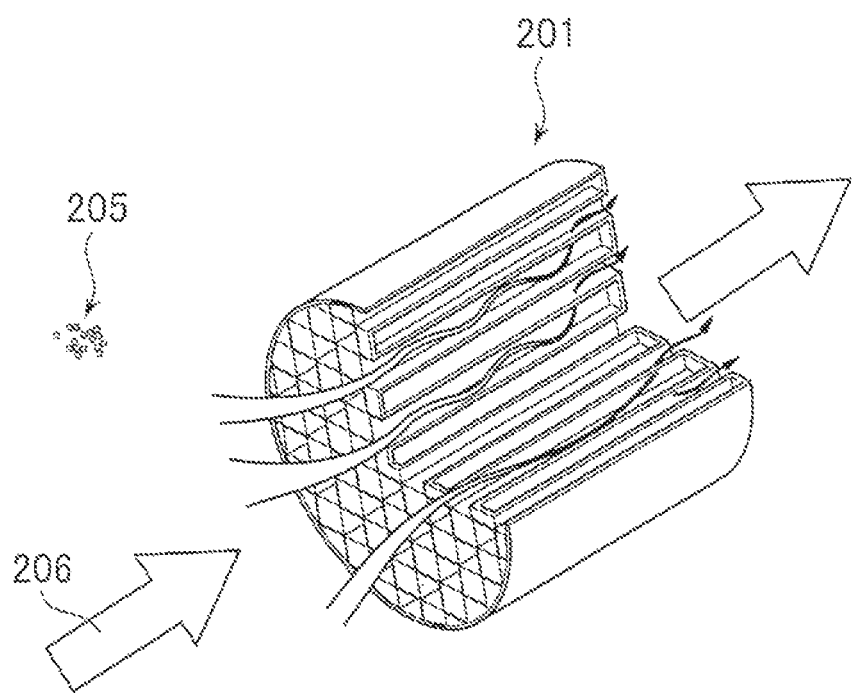
FIG. 7A is a view illustrative of the advantages of a honeycomb filter produced using a honeycomb filter production apparatus according to one embodiment of the invention (i.e., a perspective view showing ¼th of a honeycomb filter on which a surface collection layer is not provided)
Figure 7B:
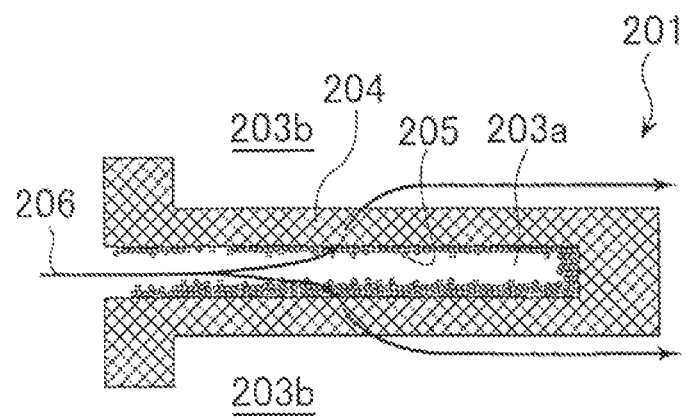
FIG. 7B is a view illustrative of the advantages of a honeycomb filter produced using a honeycomb filter production apparatus according to one embodiment of the invention (i.e., an enlarged cross-sectional view showing part (partition wall and cells) of a honeycomb filter on which a surface collection layer is not provided).

The advantages of a honeycomb filter that is produced using a honeycomb filter production apparatus according to one embodiment of the invention, and includes a collection layer formed (coated) thereon, are described below with reference to FIGS. 7A and 7B. When using a honeycomb filter 201 that is not provided with a collection layer as a PM removal filter, exhaust gas 206 containing PM 205 is introduced into a cell 203a, passes through a partition wall 204 of the honeycomb filter 201, and flows out from the honeycomb filter 201 through the open end of the adjacent cell 203b. The PM 205 is collected by the partition wall 204, so that the exhaust gas 206 is purified (see FIGS. 7A and 7B). However, when a collection layer is not provided on the surface of the partition wall 204, the PM 205 enters and clogs the pores in the partition wall 204 (base). As a result, a pressure loss rapidly increases in an early stage. When a collection layer is provided on the surface of the partition wall 204, the PM 205 does not enter and clog the pores in the partition wall 204 (base). This prevents a situation in which a pressure loss increases in an early stage (i.e., reduces a pressure loss). The honeycomb filter production apparatus according to one embodiment of the invention is a means that produces such an excellent honeycomb filter (provided with a collection layer).

Figure 2:
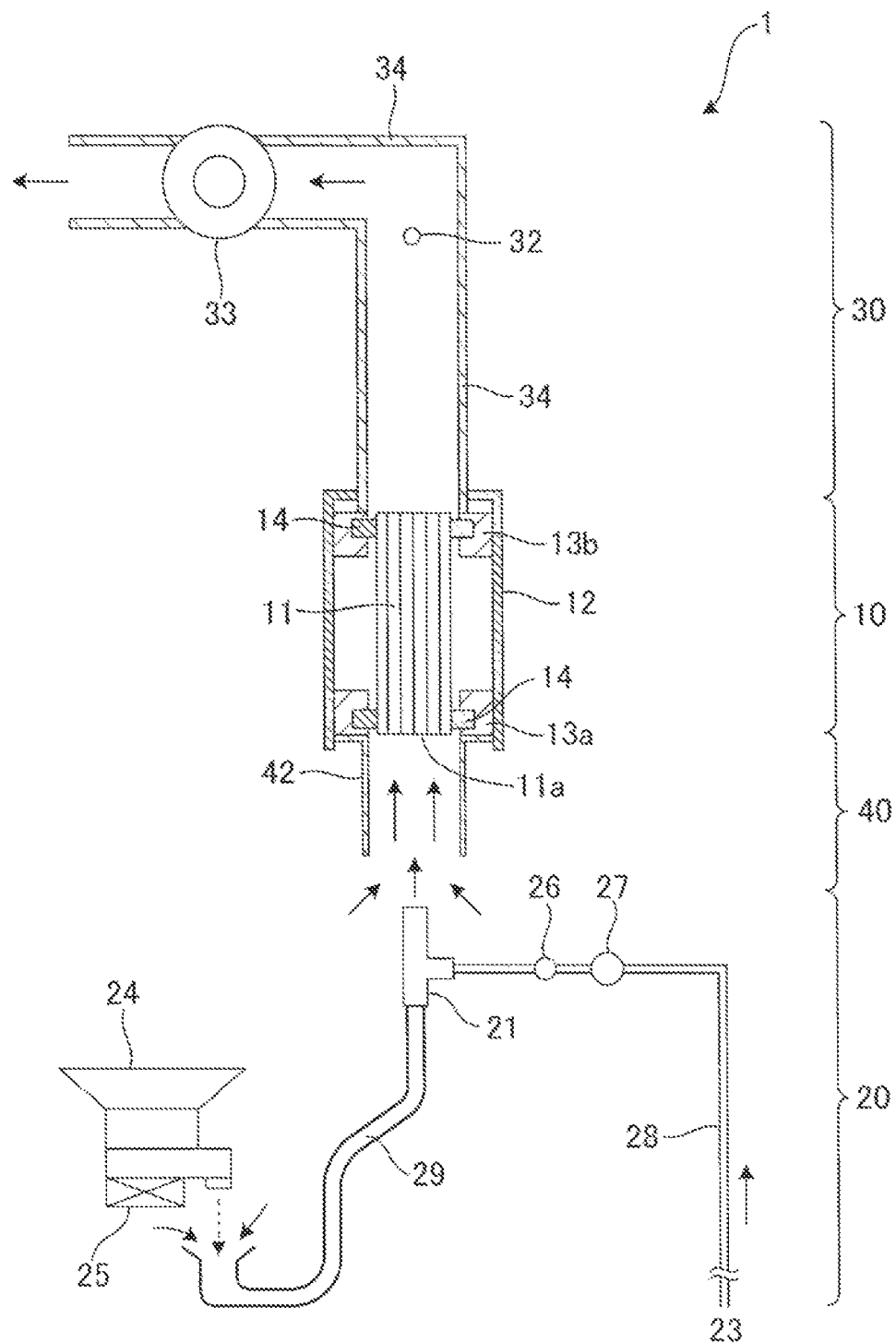
FIG. 2 is a schematic view showing a state when a powder is introduced into the workpiece by a honeycomb filter production apparatus of the present invention.

The configuration and the materials of the honeycomb filter production apparatus of a honeycomb filter production apparatus of the present invention. FIG. 1 is a schematic view showing one embodiment of a honeycomb filter production apparatus of the present invention, and FIG. 2 is a schematic view showing a state when a powder is introduced into the workpiece by the honeycomb filter production apparatus. The arrows shown in FIG. 2 show the flow of the powder, aerosol, and gas (air). Incidentally, in FIG. 2, the descriptions of the cleaning section, judgment section, and workpiece transfer section are omitted. A honeycomb filter production apparatus 1 shown in FIG. 1 includes a workpiece securing section 10, a powder transfer section 20, a suction section 30, an introduction section 40, a cleaning section 50, a judgment section 60, and a workpiece transfer section 70. A base, which is a workpiece 11, is a honeycomb filter precursor. The term "honeycomb filter precursor" refers to a honeycomb filter base on which a collection layer is formed (coated).

The workpiece securing section 10 of the honeycomb filter production apparatus 1 secures the workpiece 11 (base). The workpiece 11 (honeycomb filter precursor) is a plugged honeycomb structure formed of a ceramic. Specifically, the workpiece 11 has a prismatic columnar external shape formed by an outer circumferential surface and two end faces, and includes a plurality of cells that extend from one end face to the other end face, the plurality of cells being defined by a partition wall that is formed of a ceramic porous body having a number of pores to form a honeycomb structure. Each cell serves as a gas (fluid) passage. The workpiece 11 is configured so that adjacent cells are alternately plugged at one open end and the other open end. Therefore, each end face (i.e., one end face and the other end face) of the workpiece 11 has a checkered pattern (staggered pattern).

Figure 3:
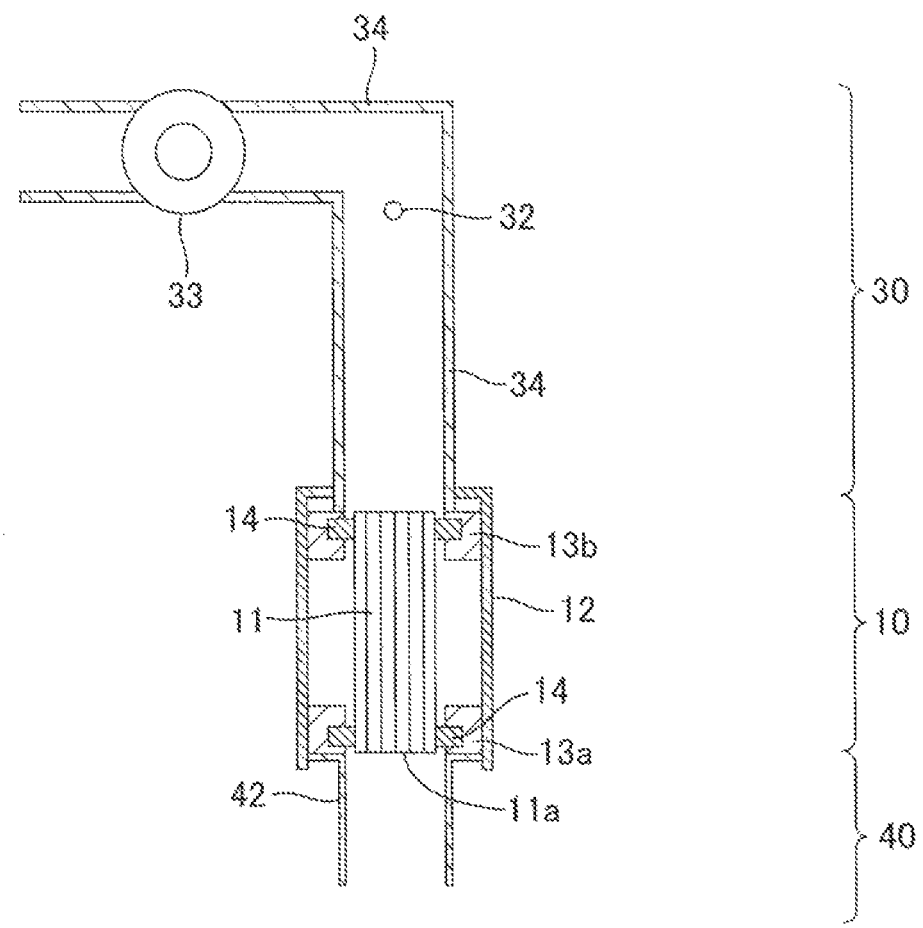
FIG. 3 is a schematic view showing a structure of the workpiece securing section of a honeycomb filter production apparatus of the present invention.
Figure 4:
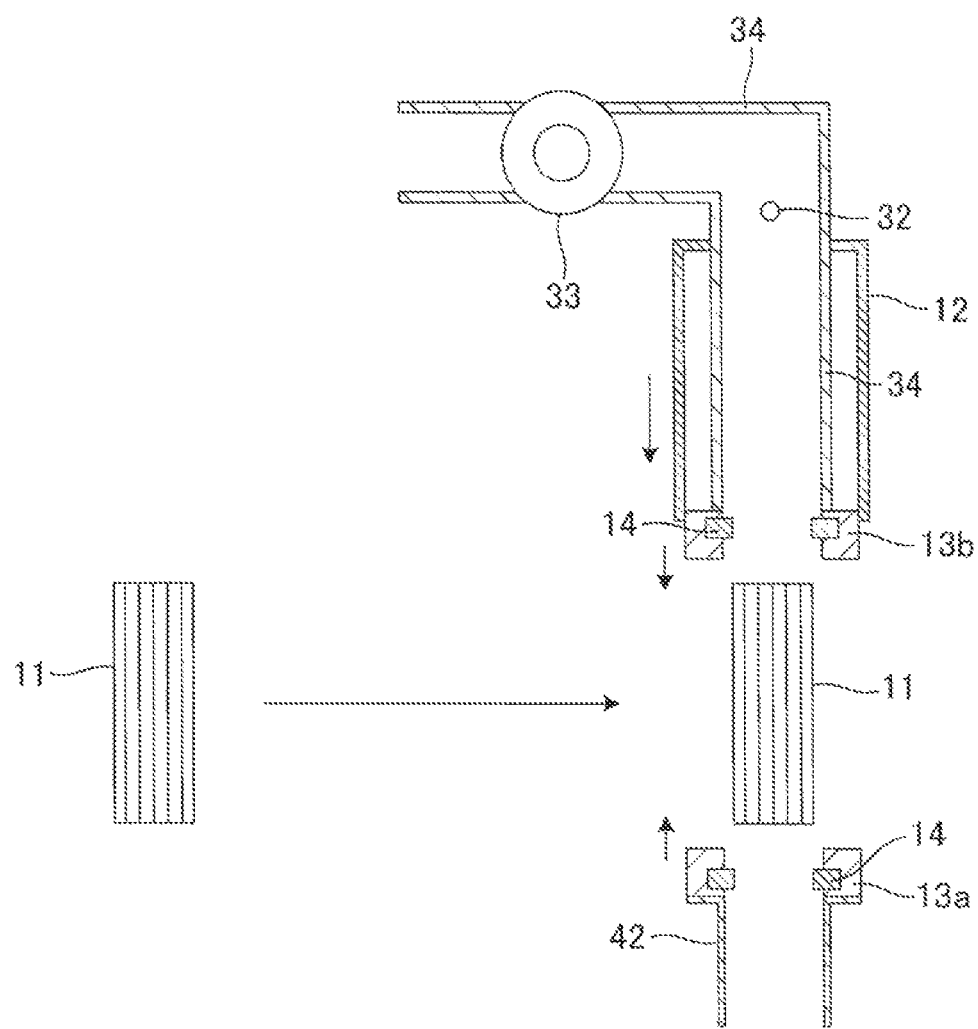
FIG. 4 is a schematic view showing a state in which a workpiece is secured on a workpiece securing section in the honeycomb filter production apparatus of the present invention.

The workpiece securing section 10 of the honeycomb filter production apparatus 1 includes workpiece chucks 13a, 13b, and a cover 12 as shown in FIG. 3. The workpiece chuck 13a is connected to the guide member 42 provided on the introduction section 40, and the workpiece chuck 13b is connected to the duct 34 constituting the suction section 30. The workpiece chucks 13a, 13b are disposed to be movable in a vertical direction. Before the workpiece 11 is transferred to the space between the workpiece chuck 13a and the workpiece chuck 13b of the workpiece securing section 10 by the workpiece transfer section 70, the interval between the workpiece 13a and the workpiece 13b is kept longer than the length (height) of the workpiece 11. Then, after the workpiece is transferred to the space between the workpiece chuck 13a and the workpiece chuck 13b by the workpiece transfer section 70, the workpiece chuck 13a ascends, and the workpiece chuck 13b descends to secure the workpiece 11. The workpiece chucks 13a, 13b firmly hold (secures) the ends of the outer circumferential surface of the workpiece 11 via a packing 14 (seal material) that is formed of a flexible material (e.g., polyurethane rubber or silicone rubber), and insulate (isolate) both the end faces of the workpiece 11 from the outer circumferential surface of the workpiece 11.

The cover 12 is disposed to be slidable in the vertical direction, and before the workpiece is transferred to the space between the workpiece chuck 13a and the workpiece chuck 13b by the workpiece transfer section 70, the cover 12 ascends to the position where it does not interfere with the workpiece 11 to be transferred. After the workpiece 11 is transferred to the space between the workpiece chuck 13a and the workpiece chuck 13b by the workpiece transfer section 70 and secured by the workpiece chuck 13a and the workpiece chuck 13b as described above, the cover 12 descends and covers the circumferential surface (side face) of the workpiece 11 to inhibit the gas from entering the workpiece 11 from the outer circumferential side. The cover 12 has a prismatic cylindrical shape similar to that of the workpiece 11. The material for the cover 12 is not particularly limited, but is preferably a metal, a resin, or the like.

The powder transfer section 20 is disposed on one side of the workpiece securing section 10. The powder transfer section 20 disperses a powder for forming a collection layer on the workpiece 11 in gas to produce aerosol, and guides the aerosol to the workpiece 11. The powder transfer section 20 that produces the aerosol is positioned on the aerosol inlet side relative to the workpiece securing section 10. The powder transfer section 20 mainly includes an ejector 21, and a powder feeding device 24 that supplies a given amount of powder.

The ejector 21 ejects a powder together with pressurized gas. The ejector 21 preferably has a mechanism that sucks a powder by utilizing a negative pressure produced by a high-speed gas, and discharges the powder together with the pressurized gas. Specifically, the ejector 21 produces aerosol. The high-speed gas is supplied to the ejector 21 at a given flow rate from a pressurized gas feeding device 23 (e.g., compressor) (not shown in FIG. 2) via a pipe 28 provided with a flowmeter 26 and a control valve 27. A powder is supplied to the ejector 21 at a given feed rate from the powder feeding device 24 provided with a gravimeter 25 (mass meter) via a tube 29. It is preferable that the ejector 21 suck a powder (see FIG. 2). This suppresses occurrence of a bridge (arch) and a rat hole in the pipe and the ejector, and prevents a situation in which powder is not supplied to the ejector 21. A (ceramic) powder that forms the collection layer includes particles that easily aggregate (cohere). The ejector 21 is effective for causing the powder to reliably adhere to the inner surface of the cells, and preventing the powder from adhering to the pipe or the like when transferring the powder using a pressurized gas. It is more preferable that the powder suction direction be approximately parallel to the aerosol discharge direction.

In order to reduce wear of the ejector 21 due to friction caused by contact with the powder, it is preferable that the surface of the ejector 21 that comes in contact with the powder be formed using diamond, diamond-like carbon (DLC), titanium nitride (TiN), titanium carbonitride (TiCN), silicon carbonitride (SiCN), silicon carbide (SiC), silicon nitride (SiN), ultra hard material, an alloy thereof, or a combination thereof. The surface of the ejector 21 may be coated, plated, or lined with these materials, for example.

A commercially available product may be used as the ejector 21, and a pipe may be connected to the main body thereof so that the ejection end extends therefrom. The diameter of the ejection end or a pipe connected to the ejector 21 may be increased in order to reduce the ejection flow rate. It is also preferable to provide a separation function to the ejector 21 or between the ejector 21 and a pipe connected thereto in order to remove large particles from the powder. The separation function may be implemented by increasing the diameter of a pipe connected to the ejector 21, producing a vortex flow, producing an upward gas flow by vertically disposing a pipe connected to the ejector 21, or inserting a screen mesh.

The powder feeding device 24 supplies (drops) a powder to the powder suction side of the ejector 21. The powder feeding device 24 is an automatic feeding device that can supply a given amount of powder. The powder feeding device 24 is preferably provided with the gravimeter 25 (mass meter). A volumeter may be used instead of the gravimeter. The powder feeding device 24 may have a screw feeding mechanism, a rotary feeding mechanism, a vibratory feeding mechanism, a table feeding mechanism, a belt feeding mechanism, or the like. The powder feeding device 24 is configured so that automatic feeding based on the time schedule can be implemented, the feed weight (mass) can be changed, and the feed rate (feed quantity/feed time) can be easily controlled.

The suction section 30 is disposed on the other side of the workpiece securing section 10. The suction section 30 sucks the aerosol ejected from the ejector 21 and mixed with gas (air) into the workpiece 11 (honeycomb filter precursor). The suction section 30 that sucks the aerosol into the workpiece 11 is positioned on the outlet side of the workpiece 11 relative to the workpiece securing section 10.

The suction section 30 mainly includes a suction machine 33 and a duct 34. The duct 34 is connected to the workpiece chuck 13b. The suction machine 33 is a fan, for example. A blower or a dust collector may also be used as the suction machine 33. The suction section 30 is preferably configured so that the suction flow rate can be controlled. For example, the suction flow rate can be controlled by variably controlling the rotational speed of an electric motor of the suction machine 33, or adjusting the diameter of the duct 34 (passage) using a valve or the like. For example, when the workpiece 11 is a honeycomb filter precursor used as a DPF installed in an automobile, the suction flow rate is preferably about 0.1 to 400 $m^3$/min.

The duct 34 (passage) of the suction section 30 is provided with an anemometer 32 that monitors the suction flow rate, and provides control data. The anemometer 32 is a hot-wire anemometer. A mechanical anemometer, a pitot tube anemometer, or the like may also be used as the anemometer 32. A filter may be disposed on the upstream side of the anemometer 32 in order to protect the anemometer 32 from the powder that has passed through the workpiece 11. A protective cover may be provided for the anemometer 32, or the anemometer 32 may be evacuated from the duct 34 when the aerosol is introduced. A blow nozzle for removing the powder adhering to the anemometer 32 may be disposed.

The honeycomb filter production apparatus 1 is configured so that the powder transfer section 20 is positioned on the lower side, and the suction section 30 is positioned on the upper side. Specifically, the aerosol is introduced into the lower side of the workpiece 11, and discharged from the upper side of the workpiece 11. A pressurized gas flows in the upward direction. Therefore, powder that does not adhere to the inner surface of the cells falls downward (i.e., can be easily collected).

The introduction section 40 of the honeycomb filter production apparatus 1 is formed between the powder transfer section 20 and the workpiece securing section 10. The introduction section 40 may be an open space where no structure is present. However, it is preferable to provide a guide member 42 that guides the powder to the workpiece 11 secured by the workpiece securing section 10. The powder transferred from the powder transfer section 20 together with a pressurized gas is mixed with another gas (e.g., air) in the introduction section 40, and introduced into the workpiece 11 secured by the workpiece securing section 10.

A guide member 42 provided in the introduction section 40 has an approximately prismatic columnar (cylindrical) shape similar to that of the workpiece 11. The guide member 42 is connected to the workpiece chuck 13a. The guide member 42 efficiently guides the aerosol ejected from the ejector 21 to the workpiece 11. The end of the guide member 42 opposite to the workpiece securing section 10 is open. Gas is sucked through the open end of the guide member 42 separately from the gas that is ejected from (passes through) the ejector 21. Specifically, the aerosol containing powder is ejected from the ejector 21 and mixed with the another gas (air), and introduced into the cells of the workpiece 11.

The guide member 42 is preferably formed of a metal, a resin, or the like in the same manner as the cover 12. Specific examples of the material for the guide member 42 include aluminum, stainless steel, brass, iron, an acrylic resin, vinyl chloride, nylon (polyamide resin), Bakelite (phenol resin), and the like. It is particularly preferable to form the guide member 42 using a conductive material, and ground the guide member 42. In order to reduce wear of the guide member 42 due to friction caused by contact with the powder, it is also preferable that the surface of the guide member 42 that comes in contact with the powder be coated, plated, or lined with diamond, diamond-like carbon (DLC), TiN, TiCN, SiCN, an alloy thereof, or a combination thereof. SiC or an ultra hard material may also be preferably used.

The cleaning section 50 is a section for removing the surplus powder adhering to the end face of the workpiece 11 after the introduction of the powder (after the coat). Almost all the powder introduced into the workpiece 11 is coated on the inner surfaces of the cells. However, at least a part of the powder adheres to the end face 11a of the workpiece 11 on the side of the powder transfer section 20. Since the powder adhering to the end face 11a of the workpiece 11 is the surplus powder which does not form a collection layer, it is necessary to remove the powder after the introduction of the powder.

In the honeycomb filter production apparatus 1 shown in FIG. 1, the cleaning section 50 is provided with an air nozzle 51 as a powder removing means for removing the surplus powder. By blowing air in parallel with the end face on the side where the powder was introduced by the air nozzle 51 after the introduction of the powder, only the powder adhering to the end face of the workpiece 11 can be removed without peeling the powder disposed on the inner surfaces of the cells of the base. The powder removed from the end face of the workpiece 11 is sucked by the discharge duct 52 arranged in a spray direction of the air nozzle 51 in the cleaning section 50. Incidentally, it is also preferable that the cleaning section 50 is provided with a brush in place of the air nozzle 51 as the powder removing means for removing the surplus powder. Also, by brushing the end face of the workpiece 11 with the brush, only the powder adhering to the end face of the workpiece 11 can be removed without peeling the powder disposed on the inner surfaces of the cells of the base.

The judging section 60 is a section for judging the amount of the powder adhering to the work 11. In order to produce a honeycomb filter having a uniform quality, it is necessary that the adhesion amount is in a predetermined range with no variance on the adhesion amount (coat amount) of the powder in each workpiece 11.

In the honeycomb filter production apparatus 1 shown in FIG. 1, the judging section 60 is provided with a scale 61 for measuring the weight of the workpiece 11 before the introduction of the powder (before the coat) and a scale 62 for measuring the weight of the workpiece 11 after the introduction of the powder as judgment means for judging the amount of the powder adhering to the workpiece 11. By measuring the weight of the workpiece 11 before and after the introduction of the powder by the scales 61, 62 and calculating the difference, a judgment on whether the amount of the powder adhering to the workpiece 11 is within the predetermined range or not can be made with high accuracy in a short period of time. Incidentally, as the scales 61, 62, it is preferable to use scales each having a resolution of 10 mg or less.

The workpiece transfer section 70 is a section driven by a driving mechanism, which is not illustrated, and transfers the workpiece 11 among the workpiece securing section 10, the cleaning section 50, and the judgment section 60. By transferring the workpiece 11 by the workpiece transfer section 70 among the workpiece securing section 10, the cleaning section 50, and the judgment section 60, the efficiency of the coat operation improves to have high productivity in comparison with, for example, the manual transfer of the workpiece 11.

In the honeycomb filter production apparatus 1 shown in FIG. 1, the workpiece transfer section 70 reciprocates with a predetermined stroke in a front-back direction. It is preferable that the driving mechanism for driving the workpiece transfer section 70 is disposed above the work piece securing section 10. Since the powder not adhering to the workpiece 11 generally falls down, by the disposition of the driving mechanism above the workpiece securing section 10, the powder not adhering to the workpiece 11 hardly enters the inside of the driving mechanism, and therefore the wear of the motion portion of the driving mechanism due to the entry of the powder is reduced to improve durability and stabilize the positional accuracy of the transfer.

Figure 5:
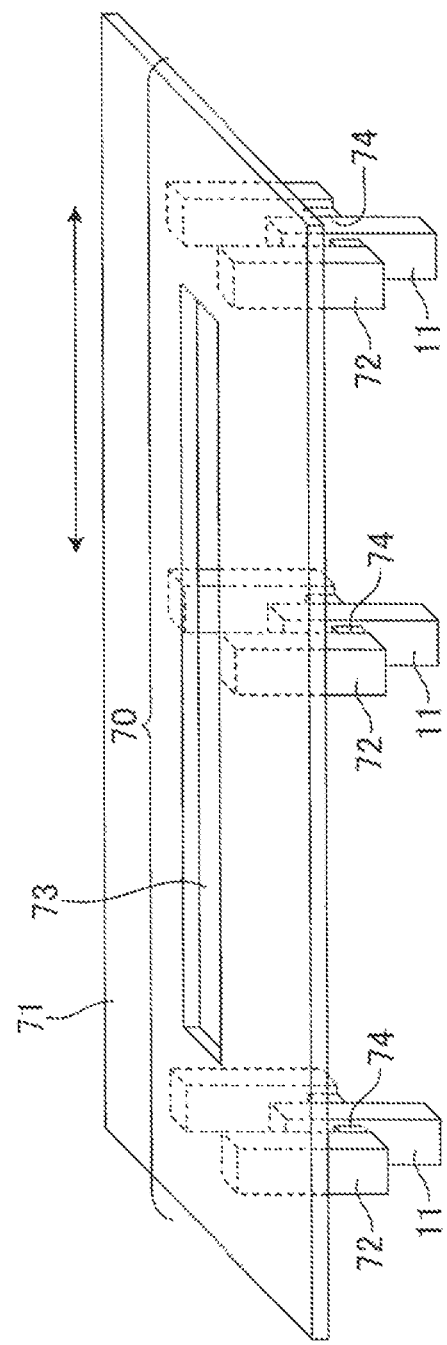
FIG. 5 is a schematic view showing a structure of a workpiece transfer section.
Figure 6:
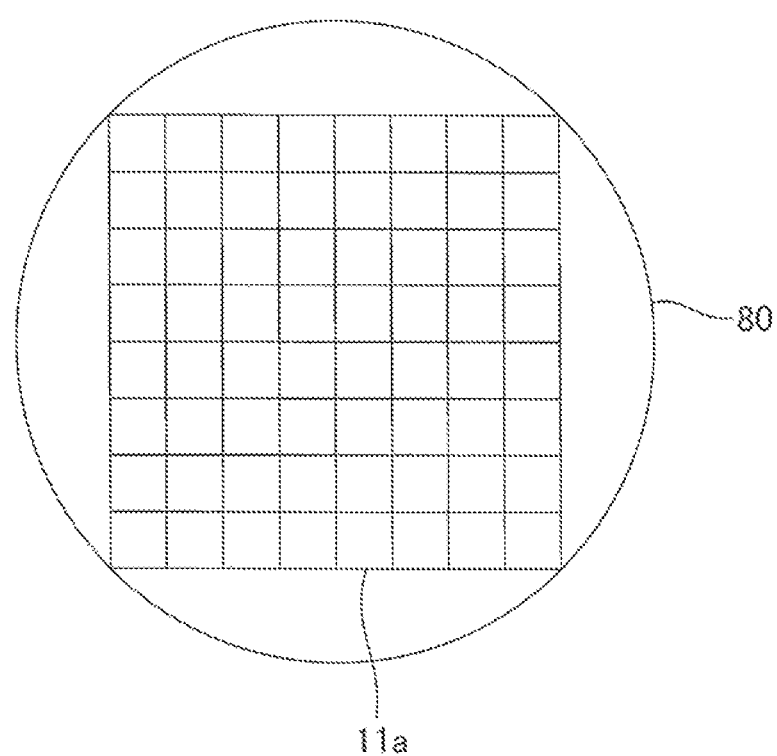
FIG. 6 is an explanatory view showing an example of a minimum circle that includes the end face of the base on the side of the powder transfer section.

In the honeycomb filter production apparatus 1, as shown in FIG. 5, the workpiece transfer section 70 is provided with a movable plate 71 disposed so that the plate faces are arranged in a horizontal direction and opening and closing clamps 72 arranged at regular intervals on the lower face side of the movable plate 71. In the movable plate 71, a slit 73 is formed lest the movable plate 71 should interfere with the workpiece securing section 10. The opening and closing clamps 72 are disposed as holding means for holding the workpiece 11 upon transferring the workpiece 11. As shown in FIG. 5, the opening and closing clamps 72 hold the workpiece 11 so as to sandwich the workpiece 11 at its outer circumferential surface. It is preferable that the opening and closing clamps 72 can control the clamp load and that each has a resin contact face 74 with the workpiece 11. By the use of the opening and closing clamps 72, by controlling the clamp load upon holding the workpiece 11, the impact upon holding can be controlled to be able to inhibit the powder coated on the inner surfaces of the cells of the workpiece 11 from peeling due to the impact upon transferring the workpiece 11 after the coat. In addition, since the contact face 74 with the workpiece 11 is made of flexible resin, the workpiece 11 can be inhibited from being damaged upon holding.

As the specific motions of the workpiece transfer section 70 upon transferring the workpiece 11, in the first place, the opening and closing clamps 72 hold the workpiece 11. Next, the movable plate 71 moves ahead. When the work 11 held by the opening and closing clamps 72 reaches the predetermined destination by the movement of the movable plate 71, the movable plate 71 stops, and the opening and closing clamps 72 open to release the workpiece 71. Then, the movable plate 71 moves back to the initial place to be in a standby state for the next transfer. In the honeycomb filter production apparatus 1, by the repetition of such transfer motions, the following transfers of (1) to (3) are performed in series.

(1) Transfer of the workpiece 11 mounted on the scale 61 to the workpiece securing section 10.
(2) Transfer of the workpiece 11 into which the powder has been introduced in the workpiece securing section 10 to the cleaning section 50.
(3) Transfer of the workpiece 11 from which the surplus powder is removed in the cleaning section 50 to the scale 62.

The configuration and the materials of a honeycomb filter production apparatus of the present invention have been described above. Note that this honeycomb filter production apparatus may be produced by utilizing commercially available instruments and parts, processing commercially available materials, and appropriately combining these instruments, parts, and materials.

A method of producing a honeycomb filter according to one embodiment of the invention is described below. The method of producing a honeycomb filter according to one embodiment of the invention includes producing a honeycomb filter using the honeycomb filter production apparatus according to one embodiment of the invention, the honeycomb filter including a base that is formed of a porous body having an approximately pillar-like external shape, the base including a plurality of cells that extend from one end face to the other end face of the base, and a collection layer being formed on the inner surface of the base.

Specifically, a forming raw material that includes a ceramic raw material is extruded to obtain a formed product that has an approximately pillar-like external shape, and includes a plurality of cells that serve as fluid passages and extend from one end face to the other end face of the formed product. More specifically, aggregate particles preferably formed of cordierite, silicon carbide, alumina, mullite, aluminum titanate, or silicon nitride, water, an organic binder (e.g., hydroxypropoxylmethyl cellulose or methyl cellulose), a pore-forming material (e.g., graphite, starch, or synthetic resin), a surfactant (e.g., ethylene glycol or fatty acid soap), and the like are mixed, and kneaded using a kneader, a vacuum deairing machine, or the like to prepare a clay. The clay is extruded to the desired shape using an extruder provided with a die having the desired cell shape, partition wall thickness, and cell density. The extruded product is dried using a microwave dryer and a hot-blast dryer to obtain a formed product.

Adjacent cells of the formed product are alternately plugged at one open end and the other open end so that each end face (i.e., one end face and the other end face) of the formed product has a checkered pattern (staggered pattern). The formed product is then fired to obtain a base. More specifically, a plugging slurry preferably of the same material as the aggregate particles are stored in a container. About half of the cells are masked on one end face of the formed product so that a checkered pattern (staggered pattern) is formed. The end face of the formed product thus masked is immersed in the plugging slurry in the container so that the opening of each unmasked cell is filled (plugged) with the plugging slurry. The cells that are plugged on one end face of the formed product are masked (in a checkered pattern (staggered pattern)) on the other end face of the formed product, and the end face of the formed product thus masked is immersed in the plugging slurry in the container so that the opening of each unmasked cell is filled (plugged) with the plugging slurry. Therefore, the cells that are not plugged on one end face of the formed product are plugged on the other end face of the formed product, and the cells that are not plugged on the other end face of the formed product are plugged on the one end face of the formed product, to obtain a structure in which the cells are alternately plugged in a checkered pattern (staggered pattern) on each end face. The plugged formed product is then calcined, cleaned, and fired to obtain a base. The combustion temperature of the organic binder is normally about 100 to 300° C., and the combustion temperature of the pore-forming material is normally about 200 to 800° C. Therefore, the calcining temperature may be set to about 200 to 1000° C. The firing temperature may be appropriately selected depending on the type of aggregate particle raw material. The firing temperature is normally about 1400 to 1500° C.

The resulting base is then weighed using a scale preferably having a resolution of 10 mg or less in the judgment section by the use of a honeycomb filter production apparatus of the present invention (measurement step before coat). Then, the base is transferred to the workpiece securing section by the workpiece transfer section, and aerosol is introduced into the cells of the base so that a powder contained in the aerosol is coated on the inner surface of the cells of the base (coat step). The average particle size of the powder (particles) is selected depending on the average pore size of the partition wall, but is preferably 1 to 15 μm. Silicon carbide, silicon nitride, cordierite, alumina, zirconia, titania, silica, aluminum titanate, or the like is preferably used as the material for the powder. The powder is particularly preferably formed of the same material as that of the aggregate particles (base).

The powder may be obtained by subjecting the material to size classification, and grinding the large particles using a jet mill (dry) or a pot mill (wet) to obtain ground particles having a sharp particle size distribution. Note that a powder having a particle size smaller than the average pore size of the partition wall of the base is coated on the surface (surface layer (i.e., the range of 20% from the surface of the partition wall in the thickness direction of the partition wall)) of the partition wall. It is conjectured that the powder (particles) having a particle size smaller than the average pore size of the partition wall does not move along the streamline of a pressurized as when the aerosol including the powder passes through the partition wall due to a particle collection mechanism (e.g., diffusion and interception), and is coated on the surface (surface layer) of the partition wall.

When coating the powder on the partition wall of the base using the honeycomb filter production apparatus according to one embodiment of the invention, the base (workpiece) is secured on the workpiece securing section, the amount of powder supplied from the powder transfer section and the flow rate of a pressurized gas (e.g., air) supplied from the pressurized gas supply device are set to given values, and the suction flow rate of the suction section is also set to a given value. It is important to set the suction flow rate of the suction section so that the flow rate inside the ejector is higher than the flow rate inside the base (partition wall) in order to reliably coat the powder on the inner surface of the cells (i.e., the surface of the partition wall) to a uniform thickness.

After coating the powder on the partition walls of the base, the base is transferred from the workpiece securing section to the cleaning section by the workpiece transfer section, and the powder remaining on the (inlet side) end face of the base through which the aerosol has been introduced is removed using an air-nozzle or the like (cleaning step). The base on which the powder is coated is then transferred to the judgment section by the work transfer section and weighed using a scale preferably having a resolution of 10 mg or less (measurement step after coat) to confirm whether or not the powder has been successfully coated.

The base is then fired so that the powder coated on the inner surface of the cells is sintered and stabilized to obtain a honeycomb filter. In this case, the firing temperature is preferably set to be lower than the firing temperature employed when producing the base. It suffices that the base be heated to a temperature at which the powder is sintered and immobilized. The firing temperature is selected depending on the material for the powder, but is preferably 1250 to 1350° C.

EXAMPLES

The invention is further described below by way of examples. Note that the invention is not limited to the following examples.

Example 1

Five plugged honeycomb structures having a quadrangular prism shape were produced using silicon carbide as aggregate particles. A powder was coated on the inner surface of the cells of the plugged honeycomb structures (bases) using the honeycomb filter production apparatus 1 shown in FIG. 1. The distance d between the end face of the plugged honeycomb structure and the ejection end of the ejector 21 when securing the plugged honeycomb structure on the workpiece securing section 10 was 290 mm. The length L of the guide member 42 was 300 mm, and the internal dimensions of the guide member 42 were 49×49 mm. The plugged honeycomb structure having a quadrangular prism shape had an axial length of 152.4 mm The size of the cross section of the plugged honeycomb structure perpendicular to its axis was 36.2×36.2 mm. The plugged honeycomb structure had a cell density of 300 cpsi (cells/in$^2$), and a partition wall thickness of 12 mils (1 mil=about 0.0254 mm). The flow rate of gas sucked by the suction section 30 was 0.4 m$^3$/min, the flow rate of gas ejected from the powder transfer section 20 was 0.1 m$^3$/min, and the flow rate of gas mixed in the introduction section 40 was 0.3 m$^3$/min. The amount of powder supplied was 2.2 g. The feed time was 3 seconds, and the feed rate was 40 g/min. The average yield obtained from the ratio of the amount of powder coated on each of the plugged honeycomb structures to the amount of powder supplied to each of the plugged honeycomb structures was 86%. In addition, the amount of the powder to each of the plugged honeycomb structures (coat amount) was 1.7 to 1.89 g, and the adhesion amount had a variance of ±5.5%. Note that the amount (g) of powder coated on the plugged honeycomb structure was determined from the difference between the weight of the plugged honeycomb structure measured in the measurement step before coat and the weight of the plugged honeycomb structure measured in the measurement step after coat, and the amount (g) of powder supplied to the plugged honeycomb structure was determined from the amount of powder supplied from the powder feeding device. The weight after the coat was measured after removing the surplus powder adhering to the end face of the plugged honeycomb structure by the air spray from the air nozzle.

Example 2

The plugged honeycomb structures obtained in Example 1 were fired to obtain plugged honeycomb structures in which a collection layer was formed. The pressure loss of each of the plugged honeycomb structures obtained above was measured in a state in which PM was coated. The pressure loss decreased as compared with the case where the collection layer was not formed. This confirms that the collection layer had an effect of decreasing the pressure loss. Samples having an identical size were cut from an area around the center (i.e., an area including the center axis) and an area around the outer circumferential surface of each of the plugged honeycomb structures. No significant difference in pressure loss between the samples was observed. Each collection layer (i.e., the inner surface of the cells) was observed using a scanning electron microscope. No difference in appearance was observed between each collection layer, and an area in which the powder was not coated was not observed. It was thus confirmed that a uniform collection layer was formed.

The above honeycomb filter production apparatus may suitably be used as a means that produces a honeycomb filter used as a DPF. A DPF is a filter that is used to collect particulate matter contained in exhaust gas discharged from an internal combustion engine (e.g., diesel engine) or a combustion apparatus to purify the exhaust gas.

What is claimed is:

1. A honeycomb filter production apparatus used for producing a honeycomb filter, the apparatus comprising:
   a workpiece securing section for securing a base of a honeycomb filter;
   a powder transfer section disposed on one side of the workpiece securing section for transferring a powder together with a pressurized gas;
   an introduction section provided between the powder transfer section and the workpiece securing section, wherein the powder transferred from the powder transfer section together with the pressurized gas is mixed with air in the introduction section and introduced into the base secured by the workpiece securing section when the apparatus is used, wherein the introduction section is in direct communication with the workpiece securing section while additionally being physically above and openly separated by a space from the powder transfer section, such that the powder with pressurized gas is mixed with air flowing through the space prior to being introduced into cells of the honeycomb filter;
   a suction section disposed on the other side of the workpiece securing section for sucking the gas that has passed through the base secured by the workpiece securing section by reducing pressure on the other side of the workpiece securing section as compared with the one side of the workpiece securing section using suction means;
   a cleaning section for removing surplus powder adhering to an end face of the base after the introduction of the powder;
   a judgment section for judging an amount of power adhering to the base; and
   a workpiece transfer section driven by a driving mechanism and transferring the base among the workpiece securing section, the cleaning section, and the judgment section.

2. The honeycomb filter production apparatus according to claim 1, wherein the driving mechanism is disposed above the workpiece securing section.

3. The honeycomb filter production apparatus according to claim 2, wherein the cleaning section is provided with an air nozzle as a powder removing means for removing the surplus powder.

4. The honeycomb filter production apparatus according to claim 2, wherein the cleaning section is provided with a brush as a powder removing means for removing the surplus powder.

5. The honeycomb filter production apparatus according to claim 2, wherein the judgment section is provided with a scale for measuring the weight of the base before the introduction of the powder and a scale for measuring the weight of the base after the introduction of the powder as judgment means for judging the amount of the powder adhering to the base.

6. The honeycomb filter production apparatus according to claim 2, wherein the workpiece transfer section is provided with opening and closing clamps each having a resin contact face with the base and being capable of controlling the clamp load as a holding means for holding the base upon transferring the base.

7. The honeycomb filter production apparatus according to claim 1, wherein the cleaning section is provided with an air nozzle as a powder removing means for removing the surplus powder.

8. The honeycomb filter production apparatus according to claim 1, wherein the cleaning section is provided with a brush as a powder removing means for removing the surplus powder.

9. The honeycomb filter production apparatus according to claim 1, wherein the judgment section is provided with a scale for measuring the weight of the base before the introduction of the powder and a scale for measuring the weight of the base after the introduction of the powder as judgment means for judging the amount of the powder adhering to the base.

10. The honeycomb filter production apparatus according to claim 1, wherein the workpiece transfer section is provided with opening and closing clamps each having a resin contact face with the base and being capable of controlling the clamp load as a holding means for holding the base upon transferring the base.

11. The honeycomb filter production apparatus according to claim 1, wherein the powder transfer section includes powder-dispersing means that utilizes pressurized gas.

12. The honeycomb filter production apparatus according to claim 11, wherein the powder-dispersing means is an ejector.

13. The honeycomb filter production apparatus according to claim 12, wherein the ejector sucks the powder by utilizing pressurized gas, and discharges the powder together with pressurized gas so that the powder is dispersed in the gas.

14. The honeycomb filter production apparatus according to claim 13, wherein a powder suction direction and a powder discharge direction of the ejector are approximately parallel.

15. The honeycomb filter production apparatus according to claim 1, wherein the powder transfer section includes powder-feeding means that supplies a given amount of powder.

16. The honeycomb filter production apparatus according to claim 1, wherein the introduction section includes a guide member that guides the powder to the base secured by the workpiece securing section.

17. The honeycomb filter production apparatus according to claim 1, wherein the powder transfer section or the introduction section includes classification means.

* * * * *